United States Patent [19]

Chan et al.

[11] Patent Number: 5,778,150

[45] Date of Patent: Jul. 7, 1998

[54] FLEXIBLE PROCEDURAL ATTACHMENT TO SITUATE REASONING SYSTEMS

[75] Inventors: Hoi Yeung Chan, Stamford, Conn.; Benjamin Nathan Grosof; David William Levine, both of New York, N.Y.

[73] Assignee: International Business Machines Corporation, Armonk, N.Y.

[21] Appl. No.: 673,880

[22] Filed: Jul. 1, 1996

[51] Int. Cl.$^6$ .................................................. G06F 15/18
[52] U.S. Cl. ............................. 395/10; 395/51; 395/11
[58] Field of Search ............................. 395/10, 51, 11

[56] References Cited

U.S. PATENT DOCUMENTS 5,271,091 12/1993 Highland et al. ........................ 395/51
5,581,664 12/1996 Allen et al. ............................ 395/51
5,586,218 12/1996 Allen ...................................... 395/10

OTHER PUBLICATIONS

The STAR Belief Base Editor Tool, A User's Guide, Version 1.00; pp. 1–14; The University College of Wales, Department of Computer Science; C. H. Orgill Aug. 1988.

The STAR Knowledge Bus, v1.00, A Descriptive Guide; Jul. 6, 1988; pp. 1–15; The University College of Wales, Department of Computer Science; C. H. Orgill.

G.L. Steele, Jr., Common Lisp: The Language, Digital Press, pp. 438–439, Dec. 1984.

C.H. Orgill, et al., "An application of a multiple agent system for flexible assembly tasks," Colloquium on Knowledge Based Environments for Industrial Applications Including Co-Operating Expert Systems in Control, pp. 3/1–3/9, Dec. 1989.

S. Dao, et al., "Smart Data Dictionary: A Knowledge-Object-Oriented Approach for Interoperability of Heterogeneous Information Management Systems," Proc. First Int'l. Workshop on Interoperability in Multidatabase Systems, pp. 88–91, Apr. 1991.

A.A. El–Zoghabi, et al., "A Client–Server Computing Model for Heterogeneous Distributed Knowledge Management," Proc. Southeastcon '93, Apr. 1993.

F. Rechenmann, "Declarative and Procedural Object–based Knowledge Modelling," Proc. IEEE Conf. Systems, Man, and Cybernetics, pp. 98–101 Oct. 1993.

M.R. Genesereth and S.P. Ketchpel, "Software Agents," Comm. ACM, vol. 37(7), pp. 48–53 and 147 Jul. 1994.

P.R. Cohen and H.J. Levesque, "Communicative Actions for Artificial Agents," Proc. First Int'l. Conf. on Multi–Agent Systems, pp. 65–72, Jun. 1995.

M. Kolb, "A Cooperative Language," Proc. First Int'l. Conf. on Multi–Agent Systems, pp. 233–238, Jun. 1995.

D. Kuokka and L. Harada, "On Using KQML for Matchmaking," Proc. First Int'l. Conf. on Multi–Agent Systems, pp. 230–245, Jun. 1995.

*Primary Examiner*—Robert W. Downs
*Attorney, Agent, or Firm*—Ohlandt, Greeley, Ruggiero & Perle

[57] ABSTRACT

The method of the invention enables the situating of reasoning engines which have the capability to store premises as knowledge representation expressions, as well as to conclude knowledge representation expressions and/or to evaluate (or test), knowledge representation expressions and/or to respond to delivered directive events that request the engine to perform reasoning. The result of the method is a situated reasoning system which extends the given reasoning engine's functionality by augmenting it with procedural attachments, using zero or more provided attached procedures. This extension of functionality permits especially the capabilities for sensing and/or effecting and/or responding to delivered directive events. The method permits attachment of the attached procedures to be dynamic or static. The method permits the given reasoning engine to be any of a variety of kinds, corresponding to variety of knowledge representations combined with a variety of control strategies: The invention further gives a method for inter-communication between multiple situated reasoning systems.

27 Claims, 7 Drawing Sheets

FLEXIBLE PROCEDURAL ATTACHMENT TO SITUATE REASONING SYSTEMS

BACKGROUND OF THE INVENTION

1. Field of the Invention

This invention relates generally to knowledge-based systems, automated reasoning systems, and intelligent agents; and, in particular, to the integrating, interoperating, and embedding of such systems with other systems or computing environments. The invention provides an extension to the area of automated reasoning to provide a highly flexible mechanism for attaching an automated reasoning system to a wide range of existing systems and environments.

2. Discussion of Prior Art (Note: for additional explanation of terminology, refer to the Terminology section of this document, below.)

Many software systems have an (automated) "reasoning" sub-system. By an (automated) "reasoning" sub-system, we mean a sub-system that uses a knowledge representation and performs automated reasoning based on that knowledge representation, e.g., to enable artificially intelligent behavior of the software system.

Some example kinds of systems that use a reasoning sub-system include:

intelligent agents, knowledge-based systems, expert systems, logic programming systems (e.g., the Prolog programming language), automated theorem-provers and deductive systems, automated decision support tools, machine learning systems, and automatic planning systems.

One useful employment of a reasoning system is to perform pure reasoning: a set of premise beliefs are supplied to the system, and the system then generates (i.e., derives) conclusion beliefs, perhaps in response to queries. For example, the system might find or check proofs of mathematical propositions, e.g., to verify a candidate design of a hardware or software computer mechanism. As another example, the system might answer queries to a extended database that contains rules as well as facts.

A second useful employment of a reasoning sub-system is to execute actions, based on the reasoning, that affect the computational environment external to the reasoning sub-system proper.

This second employment requires linking beliefs to a means for executing in the external environment. A common such means is a computational procedure, i.e., a "procedural attachment". "Procedural attachment" has been a widely used terminological concept for at least the last fifteen years within the field of Computer Science, especially in its sub-fields of Artificial Intelligence and Knowledge Representation. (E.g., see Russell and Norvig, p. 323.)

Another useful employment of procedural attachments is to access or generate values of a knowledge representation expression, upon demand by the reasoning sub-system.

An important topic, therefore, is how to augment reasoning systems with procedural attachments. This topic can be stated more concisely as: how to "situate" reasoning systems. This terminological concept of "situated" has been widely employed for at least the last seven years within the field of Computer Science, especially in its sub-field of Artificial Intelligence. (E.g., see Russell and Norvig, especially footnote on p. 403.)

Some reasoning systems are, directly, programming language systems, e.g., Prolog. In such systems, one approach to incorporating procedural attachments is to include "built-in" constructs into the programming language: e.g., procedurally attached built-in predicates in the Prolog programming language.

Another approach to incorporating procedural attachments is to include the attached procedures directly into the same compiled or interpreted computing environment as the reasoning system. (In the terminology of a particular programming language, these procedures are sometimes called "functions" or "methods".) The reasoning system then invokes the attached procedures within its same computing environment.

Typically, in both of these approaches, the vocabulary of the knowledge representation includes directly the names of the attached procedures.

However, a general drawback of these approaches is that they lack several dimensions of flexibility for integrating, interoperating, and embedding reasoning sub-systems with other systems or computing environnents. The following are desirable dimensions of flexibility; these are described below in terms of how procedural attachments "may" be employed:

1. Different runs (executions) of one particular reasoning system may employ different procedural attachments for the same knowledge representation expressions.

For example, in an Internet news filter intelligent agent server system, each combination of agent's name, e.g., the user who owns the agent, gross time interval, e.g., business hours vs. weekday evenings vs. weekends, and trigger event, e.g., news item can generate a different run in one reasoning system executing on a server. It is very useful for the same knowledge representation expression, e.g., "ShouldAlert $user", where "$user" is a logical variable, to have a different associated attached procedure depending on the agent's name and the gross time interval. E.g., it is useful for the attached procedure for user Joe to be the making of a phone call during business hours, but to be the sending of an e-mail in the weekday evenings, while for user Sue to be the making of a pager call during business hours and the sending of a fax on the weekends.

In short, it is useful for the association of a procedural attachment with a knowledge representation expression to be able to differ between different executions of one particular reasoning system.

2. If the reasoning system is compiled: the set of available attached procedures may be determined only dynamically, rather than at the time the reasoning system is compiled. E.g., a user might specify that their intelligent news agent employs a reasoning system compiled in September, with attached procedures that the user obtained only in November.

Compiling the reasoning system often has advantages, e.g., higher computational speed and/or lower computational memory space occupied.

3. Procedural attachments may originate from a different source or at a later time than some or all of the (other) premise beliefs to be used in a given run of the reasoning system. E.g., the above user of an intelligent news agent may have bought the reasoning system from one vendor, and the attached procedures from another vendor.

4. Procedural attachments may be available only in a separately compiled or interpreted fashion, or only on separate computer cpu's, from the rest of the reasoning sub-system.

5. An important case of an attached procedure is another reasoning system. E.g., one intelligent agent's reasoning system may obtain information by querying another intelligent agent's reasoning system, or may trigger another intelligent agent's reasoning system by telling it information.

The object of the invention is to provide methods and apparatus to enable the above-described dimensions of flexibility.

BACKGROUND REFERENCE MATERIAL

Reasoning

A good overview of the field of the invention is found in "Artifical Intelligence: A Modern Approach," Stuart J. Russell and Peter Norvig, Prentice-Hall, 1995, ISBN 0-13-103805-2.

A source for much of the background in the field of expert systems can be found in "Introduction to Expert Systems, Second Edition, Peter Jackson, Addison-Wesley, 1990, ISBN 0-201-17578-9

A review of logic programs can be found in the following paper and in its references: "Practical Prioritized Defaults Via Logic Programs," Benjamin N. Grosof, IBM Research Report RC 20464, Jun. 7, 1996, available via the World Wide Web at URL http://www.research.ibm.com, then click on Publications, then click on Cyberjournal, then use search interface.

Inter-Communication between Multiple Reasoning Systems; KIF/KQML

A useful portable knowledge representation and transfer encoding is based on the Knowledge Interchange Format (KIF) proposed standard, described in: "Knowledge Interchange Format Version 3.0 Reference Manual," Computer Science Department, Stanford University, Technical Report Logic-92-1, Jun. 1992. Available on the World Wide Web at the URL: http://www-ksl.stanford.edu/knowledgesharing/papers/index.html A useful high-level protocol for communication between multiple agents or multiple reasoning systems is the Knowledge Query and Manipulation Language, described in "Specification of the KQML Agent-Communication Language" T. Finin, J. Weber, G. Wiederhold, M. Genesereth, R. Fritzson, D. McKay, J. McGuire, P. Pelavin, S. Shapiro, & C. Beck. Enterprise Integration Technologies, Palo Alto, Calif. Technical Report EIT TR 92-04. Available on the World Wide Web at the URL: http://wwwksl.stanford.edu/knowledge-sharing/papers/index.html C++ Language The preferred embodiment of the invention is, in some details, presented in terms of the C++ programmig language. The definitive reference for the language is "The C++ Programming Language, Second Edition" Bjarne Stroustrup, Addison-Wesley, 1991, ISBN 0-201-53922-6.

BACKGROUND TERMINOLOGY

This document section describes details about various terminologies and concepts used in describing the invention and the claims. These terminologies and concepts are widely known in the field of Computer Science, especially its sub-field of Artificial Intelligence. (E.g., see Russell and Norvig.) Note: some terminology and details about it were earlier given in the section of this document covering "Discussion of Prior Art".

Reasoning, Inferencing, Automated Reasoning

"Reasoning" means a process by which conclusions are reached.

An interesting kind of reasoning is "inferencing". "Inferencing" means a process of reasoning that is sound, i.e., correct, with respect to a (particular) logical system, e.g., with respect to a knowledge representation and its associated formal semantics. "Automated reasoning" means reasoning that is performed automatically. In the rest of this document, "reasoning" will mean "automated reasoning", except where it is explicitly made clear otherwise.

Knowledge Representation, Knowledge Representation Expression, Belief

A "knowledge representation" is a format, grammar, or data structure for storing information. E.g., classical mathematical first-order logic, with predicate calculus syntax, is a knowledge representation. A "knowledge representation expression" is an expression in this knowledge representation. E.g., "Mortal($x)" is an expression in first-order logic. An expression may represent a belief, e.g., "Mortal (Socrates)" represents the fact-form belief that Socrates has the property of being Mortal; and "forall $x, Human($x) implies Mortal($x)" represents the rule-form belief that any individual object having the property of being Human also has the property of being Mortal. An expression may represent a schema for potential beliefs, rather than a belief: e.g., "Mortal($x)" where "$x" is a logical variable.

Oftentimes, a useful knowledge representation has an associated formal semantics that may specify the relationship of a set of (zero or more) expressions (in that knowledge representation) to truth or degree of belief, and that may specify the relationship of a set of premise expressions to a set of conclusion expressions. Reasoning, and inferencing, are relative to a particular knowledge representation, and to its semantics if it has one.

The set of all knowledge representations is hierarchical in the sense that a particular knowledge representation may be a special case or instance of another knowledge representation.

Vocabulary, Ontology

In the context of any particular knowledge representation, and of reasoning based on that knowledge representation: "vocabulary" means the set of tokens, not associated with the grammatical or format aspect of the knowledge representation, that are available and/or employed in a particular collection of knowledge representation expressions. E.g., in first-order logic, the predicate symbols and the logical-function symbols constitute vocabulary. "Ontology" is sometimes used as synonym for "vocabulary".

Assertion, Premise, Conclusion, Derivation

Viewed abstractly, reasoning is a process of generating, i.e., deriving, conclusions, based on a set of premises that have the status of assertions.

Control Strategy, Query, Answer, Backward Direction, Forward Direction, Search, Trigger, Selective, Exhaustive, Mixed Direction, Agenda Viewed as a procedural method, reasoning in a knowledge representation that has formal semantics is performed according to a "control strategy". "Control strategy" means a set of constraints on the sequencing and/or selection of steps in which to derive conclusions, or search for conclusions, that are correct relative to a set of premises (and relative to the knowledge representation and its associated formal semantics). One common and useful control strategy is to "answer" a "query" by proceeding in a "backward direction" from the query, which is sometimes called a "goal". Another common and useful control strategy is to proceed in a "forward direction" from a "trigger" subset (possibly all) of the set of premises, so as to derive a subset, possibly empty and possibly complete, of the correct conclusions whose justification involves that trigger subset. One says that this forward direction reasoning is "selective" if less than complete, or "exhaustive" if complete. "Mixed direction" control strategy means one that involves a mix of forward and backward directions in searching among the space of potential conclusions, and of associated subsets of the premises. An explicit "agenda" specifies an ordering that constitutes the constraints of a control strategy; it is one kind of mechanism used to implement a control strategy. For example, one kind of explicit agenda specifies a total ordering of which rules are to be attempted or tested, as part of exhaustive forward direction inferencing in the Horn-form subset of first-order logic.

Reasoning Engine, Inference Engine, Pure, Situating

"Reasoning engine" means a method, apparatus, or system for automated reasoning. "Inferencing engine" means a reasoning engine that performs inferencing. A "pure" reasoning engine or system means one that is not "situated". (Recall the discussion of "situated" in the section of this document on "Discussion of Prior Art".) "Situating" a pure reasoning engine means augmenting or modifying it to have procedural attachments.

Some Knowledge Representations with Formal Semantics

The following are some useful knowledge representations with formal semantics:
1. Classical mathematical higher-order logic.
2. Classical mathematical first-order logic. This is a subclass of (1.).
3. Horn clause subset of first-order logic. This is a subclass of (2.).
4. Propositional logic. This is a subclass of (2.).
5. Uncertain reasoning, e.g., based on Bayesian probability, on Bayesian probabilistic decision theory, or on fuzzy logic, or on possibility theory.
6. Bayesian probability.
7. Bayesian probabilistic decision theory, in which probabilistically expected utility is maximized or satisficed.
8. Bayesian probability with "thresholding". "Thresholding" means that any knowledge representation expression having probability value exceeding a particular numerical threshold is treated as definitively concluded rather than just having status as having a degree of uncertainty.
9. Fuzzy logic.
10. Fuzzy decision theory.
11. Fuzzy logic with "thresholding". "Thresholding" means that any knowledge representation expression having fuzzy truth value exceeding a particular numerical threshold is treated as definitively concluded rather than just having status as having a degree of uncertainty.
12. Possibility theory.
13. Nonmonotonic logic, e.g., logic programs with negation-as-failure or with prioritization.
14. Ordinary logic programs, e.g., cf. Prolog.
15. Extended logic programs. These augment ordinary logic programs by permitting restricted appearance of classical negation.
16. Courteous logic programs. These augment ordinary logic programs and extended logic programs by permitting prioritization between different rules (clauses).
17. Modal logic, either monotonic or nonmonotonic.
18. Inductive learning or statistical analysis, in which derived conclusions are predictions, patterns, and/or hypotheses.

The above knowledge representations are discussed, for example, in Russell and Norvig, with the exception of extended and courteous logic programs; for those, see Grosofs "Practical Prioritized Defaults Via Logic Programs" (detailed reference is given in the "Reference Material" section of this document).

Recall the earlier remark that the space of knowledge representations is hierarchical; some knowledge representations are special cases or subclasses of others. E.g., some of the members of the above list of knowledge representations are special cases or subclasses of other members of the list.

A BRIEF DESCRIPTION OF THE DRAWINGS

FIG. 1: FIG. 1 provides a diagramatic representation of the process of situating a reasoning engine. It shows the various components which are added to, or modified in the process of situating a reasoning engine.

FIG. 2: FIG. 2 provides a diagrammatic representation of the main elements comprising a situated reasoning system with two attached procedures. It shows the state of the system during a simple reasoning operation.

FIG. 3: FIG. 3 provides a diagrammatic representation of two situated reasoning systems communicating via an attached procedure acting as an effector and as a directive event deliverer.

FIG. 4: FIG. 4 provides a diagrammatic representation of two situated reasoning systems communicating where an attached procedure acts as an effector to one system and a sensor to another.

FIG. 5: FIG. 5 provides a diagrammatic representation of two situated reasoning systems communicating where an attached procedure acts as a sensor to one system and a query directive-event deliverer to another.

FIG. 6: FIG. 6 provides a diagrammatic representation of the details of the query directive-event delivery mechanism and the return of responses from a query.

FIG. 7: FIG. 7 provides a diagrammatic representation of the process of situating a reasoning engine.

SUMMARY OF THE INVENTION

This invention will be described with reference to FIG. 1, FIGS. 3 through 5, and FIG. 7. Those skilled in the art will readily appreciate that the description with respect to these figures is for explanatory purposes only and is not intended in any way to limit the scope of the invention.

Terminology

The following terminology is defined to aid in the description of the invention.

Effecting, Effector

"Effecting" means the sub-process of invoking an attached procedure, upon the occasion of establishing an associated knowledge representation expression as a conclusion during a reasoning engine's reasoning process, so as to execute an action that affects the computational environment external to the reasoning sub-system proper. "Effector" means an externally attached procedure which can be invoked (or called) by a reasoning engine to perform effecting.

Sensing, Sensor

"Sensing" means the sub-process of invoking an attached procedure so as to determine the value of an associated knowledge representation expression that is being evaluated or tested during a reasoning engine's reasoning process. "Sensor" means an externally attached procedure that can be invoked (or called) by a reasoning engine to perform sensing.

Directive Event Delivery; Request, Query, Trigger, Compound; Event Queue

The terminology described in the following three paragraphs, which are about directive event delivery, applies relative to the context of a particular reasoning engine.

"Directive-event delivery" means an invocation of the reasoning engine's external interface. For example, a procedure, perhaps an attached procedure in the environment external to the reasoning engine, may deliver a directive event. One common and useful kind of delivered directive event is to direct or to request the reasoning engine to perform reasoning. The invention's description focuses attention on this kind of delivered event. As part of this kind of delivered directive event, it is common and useful to also include a set of new assertions for the reasoning engine to add to its set of premises before performing reasoning.

Within this kind of delivered directive event, there are two common and useful sub-kinds. The first such sub-kind, called "query", of delivered directive event includes to specify a query and to request the reasoning engine to perform backward-direction inferencing to answer that query. The second such sub-kind, called "trigger", of delivered directive event includes to specify a trigger subset (possibly empty and possibly complete) of premises, and to request the reasoning engine to perform forward-direction inferencing based on that trigger subset. A third such sub-kind, called "compound", of delivered directive event is a compound of the last two sub-kinds: it includes to specify a combination of one or more queries and/or one or more triggers.

An "event queue" is a queueing, or queueing-like, mechanism that a reasoning engine uses to accept or receive (delivered) directive events. Useful kinds and sub-kinds of event queues correspond to the useful kinds and sub-kinds of delivered directive events described in the last two paragraphs. For each such kind or sub-kind, a given reasoning engine may have, or may not have, the corresponding queue. In the case of the compound sub-kind, an alternative implementation comprises two queues, one for queries and one for triggers, instead of a single queue for compound directive events.

Portable Version of Knowledge Representation

A "portable version" of a knowledge representation expression, or of an entire knowledge representation, means a form, portable across multiple reasoning engines, which is sufficiently self describing to permit it to be easily parsed into the specific knowledge representation expression required for use within a specific reasoning engine. KIF and KQML (see section on "Background Reference Material") are two developing standards widely used to embody portable representations of knowledge representation expressions and directives.

Overview

The invention gives a method for situating a given reasoning engine. The method makes a particular requirement on the given reasoning engine. This requirement is that the engine have the capability to store premises as knowledge representation expressions, as well as to conclude knowledge representation expressions and/or to evaluate (or test) knowledge representation expressions and/or to respond to delivered directive events that request the engine to perform reasoning. The result of the method is a situated reasoning system which extends the given reasoning engine's functionality by augmenting it with procedural attachments, using zero or more provided attached procedures. This extension of functionality permits especially the capabilities for sensing and/or effecting and/or responding to delivered directive events. Delivered directive events may be of query, trigger, or compound (sub-)kinds.

In outline, the method comprises, in addition to providing the given reasoning engine (FIG. 1, 101) and providing the attached procedures: registering the attached procedures; providing a specified mapping between knowledge representation expressions (of the engine) and the attached procedures; (FIG. 1, 105) and invoking the attached procedures during the process of situated reasoning, using the specified mapping and registration.

The provided attached procedures' procedural interfaces pass knowledge representation expressions of a kind compatible with the knowledge representation expressions of the given reasoning engine.

Registering an attached procedure includes registering its name and its procedural interface. Registering attached procedures makes the situated reasoning system be aware of them. This prepares the situated reasoning system to use the attached procedures, by invoking them during the process of situated reasoning.

The mapping is partial (indeed, it may be empty) and is specified by zero or more mapping elements. Each such element includes: a knowledge representation expression (e.g., a predicate of first-order logic) and the name of an attached procedure. The mapping is used for sensing and/or effecting (if any such is performed by the engine; recall that the engine is not required even to be capable of concluding or evaluating knowledge representation expressions). (FIG. 1, 108)

The method permits attachment of the attached procedures to be dynamic or static. The method permits registration also to be dynamic or static. The method permits attached procedures to be present or to be built separately from the engine (this separate-ness can be viewed as external-ness relative to the engine), in several dimensions of separate-ness. In the next paragraph, we list those dimensions of separate-ness.

The attached procedures are permitted to be separately compiled, and/or separately interpreted, and/or have a separate address space, and/or reside (or execute) on a separate cpu (central processing unit). Attached procedures are permitted to be loaded in a variety of manners, and to have initialization routines for them be executed, once or at multiple times, including in a manner that accords to the mechanisms of the computing environment in which the situated reasoning system resides.

The method permits the given reasoning engine to be any of a variety of kinds, corresponding to variety of knowledge representations combined with a variety of control strategies: including all of the knowledge representations and (combined with) all of the control strategies listed in the section "Background Terminology" (recall especially the sub-sections there entitled "Some Knowledge Representations with Formal Semantics" and "Control Strategy . . .").

The invention further gives a method for inter-communication between multiple situated reasoning systems. A situated reasoning system may use zero or more of three kinds of such inter-communication. In the first kind, an attached procedure is a sensor for one such system, and delivers a query directive event to another such system. In the second kind, an attached procedure is an effector for one such system, and delivers a trigger directive event to another such system. In the third kind, an attached procedure is an effector for one such system, and is a sensor for another such system.

The Invention

A system operating in accordance with the invention would be a general purpose computer, programmed in the manner described below.

The invention is described in the following sections. The first section, "Situating a reasoning engine," describes the steps of the method of situating a reasoning engine. The second section, "inter-engine communications," describes the steps of several methods for using attached procedures and a situated reasoning engine to achieve inter-engine communication.

Situating a Reasoning Engine

The invention gives a method to situate a reasoning engine.

The method makes a particular requirement on the given reasoning engine. This requirement is that the engine have the capability to store premises as knowledge representation expressions, as well as to conclude knowledge representation expressions and/or to evaluate (or test) knowledge representation expressions and/or to respond to delivered directive events that request the engine to perform reasoning. In the case that the engine has the capability to respond to delivered directive events that request the engine to perform reasoning, the engine then has corresponding queues or queue-like mechanism.

This method, to situate a reasoning engine, comprises adding to the reasoning engine the following steps (1.) through (8.). In the description of these steps ((1.) through (8.)), "reasoning process" refers to that of the reasoning engine.

1. adding a registry, dynamic or possibly static, of attached procedures

This step comprises:
adding a registration associative data structure which provides a mapping between a named attached procedure and the information required to invoke that procedure, said information including
the name of the attached procedure,
whether the attached procedure is a sensor and whether it is an effector, and
the procedural interface (including the parameterization of the attached procedure), if such interface is not implicit;
calling a routine to make this association, at the time the attached procedure is attached to the the reasoning engine; and
providing a procedure for calling the attached procedure by name through the use of the associative structure, (709, with the mapping expanded in 706 and 708).

2. adding a step of loading attached procedures

This step comprises:
adding a list, possibly configurable, of attached procedures to be loaded into the situated reasoning system;
using the mechanisms of the computing environment in which the situated reasoning system resides to load the attached procedures; and
if necessary, causing the initialization routines of the attached procedures to be executed.

This step may be performed once, during the initialization of the situated reasoning system; or at multiple times, during the execution of the reasoning system; or may be subsumed into the process of building the situated reasoning system, depending on the structure of the situated reasoning system and on the desired usage of the attached procedures.

3. adding the means to specify mappings between the reasoning engine's knowledge representation expressions and the attached procedures, said mapping to be specified through augmentation of the reasoning engine's knowledge representation.

This step comprises:
adding a stored mapping associative data structure that augments the reasoning engine's knowledge representation, said structure enabling the engine to determine an association from any particular knowledge representation expression, of the engine, to zero or more attached procedures; and providing a means for the specification, of this mapping, to be expressed within the mechanism used to convey the augmented knowledge representation's premises into and out of the reasoning engine. (701).

The resulting mapping thus specifies:
a. an association from any particular knowledge representation expression, of the engine, to zero or more sensor attached procedures, and
b. an association from any particular knowledge representation expression, of the engine, to zero or more effector attached procedures;
the mapping having been specified as part of the augmented knowledge representation's premises.

4. adding the step of sensor selection to the reasoning process

This step comprises adding algorithmic control logic, to the reasoning engine, which is executed at the points where the reasoning engine evaluates or tests any particular knowledge representation expression.

Said addition comprises:
determining the candidate set (possibly empty) of sensors which are associated with that particular knowledge representation expression, using the associative mapping of step (3.);
sensing by invoking a subset (possibly empty and possibly all) of the candidate set of sensors, said invocation using the method of step (5.).

The subset, of sensors which are invoked, is determined by the following method (4b.).

(4b.) If the engine can determine, without sensing, the value of the knowledge representation expression, then the subset (of invoked sensors) is empty; else (i.e., if the engine without sensing cannot determine, without sensing, the value of the knowledge representation expression, then) invoke each sensor in the candidate set of sensors, iterating over that candidate set, until:
one of the sensors, by virtue of its return value or values, establishes a value for the knowledge representation expression; or
the candidate set is exhausted. (End of (4b.))

5. adding the step of invoking a sensor to the reasoning process

This step comprises:
invoking the attached procedure by:
using the registration mechanism added in step (1.),
passing, to the attached procedure, the corresponding parameters of the knowledge representation expression, and
executing the attached procedure; and then
accepting the return value or values produced by the attached procedure; and then
establishing the value of the knowledge representation expression, based on that return value or values, by integrating the return value or values into the reasoning engine's knowledge representation.

This is represented diagramatically as arrow 711 in FIG. 7.

6. adding the step of effector selection to the reasoning process

This step comprises adding algorithmic control logic, to the reasoning engine, which is executed at the points where the reasoning engine concludes any particular knowledge representation expression. Said addition comprises:

determining the candidate set (possibly empty) of effectors which are associated with that particular knowledge representation expression, using the associative mapping of step (3.);

effecting by invoking each of the effectors in that candidate set of effectors, said invocation using the method of step (7.).

7. adding the step of invoking an effector to the reasoning process

This step comprises invoking the attached procedure by:
using the registration mechanism added in step (1.),
passing, to the attached procedure, the corresponding parameters of the knowledge representation expression, and
executing the attached procedure, thereby achieving an action in the computing environment external to the reasoning engine.

8. For those reasoning engines that have the capability to respond to a delivered directive event: adding the ability to respond to directive events delivered by attached procedures, comprising exposing the appropriate event queue to the attached procedures so that they may deliver directive events to that queue.

Extension to Specifying the Mapping (step (3.) above)

The invention includes a further method for specifying the mapping of step (3.) above, comprising the specifying of zero or more mapping elements, each mapping element comprising:

a knowledge representation expression of the engine; and
the name of an attached procedure.

A useful case, described in the section "Detailed Description of the Current Preferred Embodiment", of this method is when the knowledge representation expression is a first-order-logic predicate and the attached procedure is a sensor or an effector.

A First Extension to Sensor Selection

The invention includes a further method in which sensor selection is modified as follows: (4b.) above is modified to delete "If the engine can determine, without sensing, the value of the knowledge representation expression, then the subset (of invoked sensors) is empty; else (i.e., if the engine without sensing cannot determine, without sensing, the value of the knowledge representation expression, then)".

A Second Extension to Sensor Selection

The invention includes a further method in which sensor selection is modified as follows: (4b.) above is modified so that some or all of the sensors, in the candidate set of sensors, are invoked in parallel rather than iteratively.

An Extension to Sensor Invocation (Step (6.) above)

The invention includes a further method in which in the step of sensor invocation (Step (6.) above), the sub-steps of invoking attached procedures and accepting their responses are modified by in addition performing a computational transformation of knowledge representation expresions, comprising:

1. adding additional information to the mapping between the knowledge representation and the attached procedure, specifying a correspondence between: the parameters or variables, and/or the expression format, grammar, or data structure of the attached procedure's representation; and the parameters or variables and/or the expression format, grammar, or data structure of the given reasoning system's knowledge representation expressions.

2. Transforming the knowledge representation expressions of the attached procedure's procedural interface according to the specified correspondence.

Extension to Achieve Static Attachment

The invention includes a further method to achieve the static, rather than dynamic, attachment of one or more (possibly all) of the attached procedures, said method comprising:

1. extending the existing reasoning engine through the provision of statically attached procedures which are included as part of the reasoning engine, and conform to the invoking interface of attached procedures; and 2. providing for the registration of these attached procedures as part of the initialization and startup processes of the reasoning engine.

Said statically attached procedures may be mapped to knowledge representation expressions either through static mappings performed within the reasoning engine at initialization and startup time, or through the normal methods provided in the course of situating the reasoning, to wit, the inclusion of the mapping in the mechanism used to load the reasoning engine's knowledge representation expressions.

Extension to Portable-Version Knowledge Representation

The invention includes a further method in which the knowledge representation employed in delivered directive events is portable-version, this method comprising:

parsing the portable-version knowledge representation expressions delivered in portable-version form;

building a representation, specific to the reasoning engine, of the delivered directive event; and processing said event.

Extension to Interpreted Attached Procedures

The invention includes a further method in which attached procedures may be interpreted rather than compiled, this method comprising the construction of one or more attached procedures that:

1. register the interpreted attached procedures to the situated reasoning engine;

2. accepts the invocation from the reasoning engine and invoked the interpreted environment with the appropriate source code;

3. passes, to the interpreted code, any parameters required by that interpreted code;

4. accepts any responses from the interpreted code; and 5. reflects these responses to the reasoning engine.

Extension to Interpretive Directive Event Delivery

The invention includes a further method enabling attached procedures implemented in interpretive fashion to deliver directive events. This method comprises:

providing a specialized attached procedure which acts as a bridge between the reasoning engine and the interpretive computing environment;

providing a set of routines within the interpretive computing environment to interact with said bridge;

loading the bridge attached procedure into the situated reasoning system; and loading the interpretive routines into the interpetive computing environment.

The bridge attached procedure comprises:

1. the code to register to an inter-process communication (IPC) mechanism which may be used by the interpretive environment to communicate with the bridge attached procedure;

2. the code to accept delivered directive events from the IPC mechanism and reflect them to the reasoning engine; and 3. in the case of query directives: the code to register, to the reasoning engine, the bridge attached procedure to receive responses from the reasoning engine, and the code to direct these responses to routine described in (2.) immediately below, which resides in the interpretive computing environment for the purpose of receiving these responses.

The routines within the interpretive computing environment comprise:

1. a routine, to be invoked by other interpretive directive-event deliverers to deliver directive events, through the IPC mechanism, to the bridge attached procedure;
2. in the case of query directive events: a routine to receive responses from the bridge attached procedure and reflect them to the originator of the query directive event; and
3. a routine to register the routines (1.) and (2.) immediately above to the IPC mechanism being used to communicate with the bridge attached procedure.

Extending Attached Procedures Beyond the Single Process Model

The invention includes a further method enabling attached procedures to reside in a separate address space ("cross-address-space"), and/or to reside in separate processes within a single computer ("cross-process"), and/or to reside on separate computers ("cross-computer"), from the reasoning system and/or the other attached procedures that are included in the situated reasoning system.

This method comprises:

1. providing an implementation of the knowledge representation's computing environment that:
   if cross-address-space or cross-process: is shared-memory, and
   if cross-computer: is distributed-system;
2. augmenting the method of registering an attached procedure to include information specifying whether the attached procedure is cross-address space, cross-process, or cross-computer, or none of those (i.e., "normal"-ly attached, in the manner described in the first method of this section "The Invention");
3. augmenting the method of invoking an attached procedure to use the information in the last step immediately above;
4. extending the routines for registering and invoking attached procedures to use mechanisms, available in the computing environment in which the engine is being implemented, that are the cross-address-space or cross-process or cross-computer or normal as appropriate.

Extension to Subordinate Attached Processing

The invention includes a further method in which the attached procedures may be used to invoke computing elements outside the attached procedures to perform any proper subset of the work being performed by the attached procedure. This method extends the redirection of the attached procedures used by situated reasoning engines, said method comprising constructing an attached procedure that:

1. attaches to a situated reasoning engine as a sensor, or effector, or deliverer of directive events;
2. uses existing facilities of the computing environment in which it resides to invoke computing elements which reside in other computers, and/or which reside in other computing environments within the computer in which the attached procedure resides; and
3. uses said invocation to assist in the process of satisfying requests.

Inter-Engine Communications

The invention includes further methods of using attached procedures to enable or to permit communication between multiple reasoning systems. Three methods for achieving inter-engine communications are described: Effector/Delivery Coupling, Effector/Sensor Coupling, and Sensor/Query Coupling. Any subset (possibly all) of these methods may be employed, either separately or in combination, to achieve a range of communication flows between situated reasoning engines. Each method is described in greater detail below.

Effector/Delivery: Attention is drawn to FIG. 3 for this method.

The method for multiple reasoning engines to communicate via the coupling of an effector attached procedure with a directive-event deliverer attached procedure, comprises building an attached procedure that:

1. attaches to one or more situated reasoning engines as an effector (305);
2. attaches to one or more situated reasoning engines as a directive-event deliverer (306);
3. upon invocation as an effector, delivers the information passed to it (305) onwards, as part of the information in a delivered directive event, to one or more of the situated reasoning engines (306).

Effector/Sensor Coupling: Attention is drawn to FIG. 4 for this method.

The method for multiple reasoning engines to communicate via the coupling of an effector attached procedure with a sensor attached procedure comprises building an attached procedure that:

1. attaches to one or more situated reasoning engines (401) as an effector (402);
2. attaches to one or more situated reasoning engines (404) as a sensor (402);
3. upon invocation as an effector, stores the information passed to it (407); and
4. upon invocation as a sensor, retrieves the current stored value or values, based on the passed information of the last step immediately above, and uses those stored value or values so as to construct its return values (406).

The invention includes a further method in which the method immediately above is modified to break up the above attached procedure into two or more attached procedures, said further method comprising the utilizing of an inter-process communication mechanism so as to transmit the stored value or values between the separate effector(s) and sensor(s).

Sensor/Query Coupling: Attention is drawn to FIG. 5 for this method.

The method for multiple reasoning engines to communicate via the coupling of a sensor attached procedure with a query directive-event deliverer attached procedure, comprises building an attached procedure that:

1. attaches to one or more situated reasoning engines as a sensor (502);
2. attaches to one or more situated reasoning engines as a query directive-event deliverer (503);
3. upon invocation as a sensor (506):
   builds and delivers a query directive event to one or more situated reasoning engines(507),
   receives the response or responses to said query directive event(s) (508), and
   builds a response to the original sensing request based on that response or responses (509);

returns that built response to original sensing engine. (506)

The invention includes a further method in which the method immediately above is modified to break up the above attached procedure into two or more attached procedures, said further method comprising the utilizing of an inter-process communication mechanism so as to transmit the stored value or values between the separate effector(s) and sensor(s).

Extension to Given Reasoning Engine Already Having Procedural Attachments

The invention includes a further method in which the given reasoning engine is permitted to already have procedural attachments. In such a case: situating the engine according to our invention's other methods then augments that engine's procedural attachments.

DETAILED DESCRIPTION OF THE CURRENT PREFERRED EMBODIMENT

Figure 1:
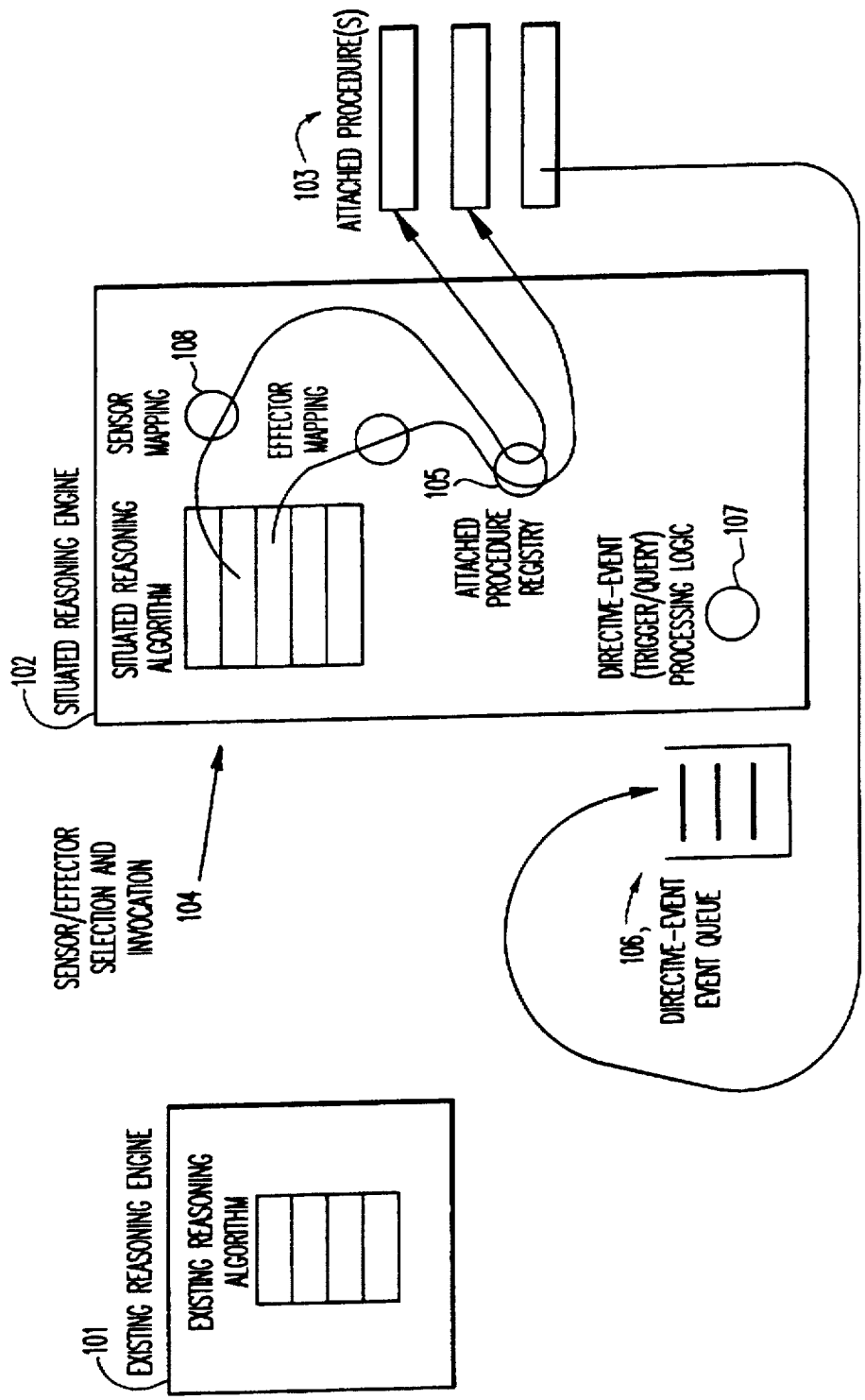

The current preferred embodiment of the invention is in the form of the Reusable Agent Intelligence Software Environment (RAISE) toolkit. The RAISE toolkit in its current version comprises a situated forward chaining inferencing engine implementing the dynamic loading and registration of attached procedures. In addition, the design of the RAISE toolkit extends straightforwardly to further comprise a version in which forward chaining is replaced instead by backward chaining.

The current version of the RAISE toolkit is implemented in IBM VisualAge C++ version 3.0 for IBM OS/2 Warp version 3.0. The RAISE toolkit also includes the libraries and header files required to build attached procedures and several sample collections of attached procedures.

The source code for a version of the RAISE toolkit is included as Appendix A of this patent application. The release notes pertaining to this version of the toolkit is included as Appendix B of this patent application. The release notes (documentation) include information on authoring inference rules for use in the toolkit, as well details on the process of authoring attached procedures for the toolkit.

Parts and concepts

A preferred embodiment of the invention includes:

RAISE Reasoning Engine

Attached procedures

Adapters

Attached procedure registry

Dynamic registration algorithm

Reasoning Context

Knowledge Representation Expression to attached procedure mapping

Algorithm for Selecting Sensors during reasoning

Algorithim for invoking attached procedures

Event Delivery mechanism

Each part and algorithm, along with the general scheme of use will be described below.

Overall Description

Reasoning Engine

The RAISE reasoning engine is an agenda-driven forward-chaining inferencing engine operating on a restricted class of Horn-form rules of classical first order mathematical logic, augmented by procedural attachments. (For a general discussion of the use of horn form rules in inferencing, refer to Russell and Norvig, p. 270, as mentioned in the section "Background Reference Material")

Attached Procedures

Attached procedures are used to extend reasoning engines. They conform to a specific interface, including a registration process and providing a consistent interface to the reasoning engine. Conceptually, attached procedures may invoke any processing they desire to perform tasks. See also the disussion of procedural attachement in the background material and the invention proper.

Adapters

In the current embodiment, attached procedures are packaged in a unit called an adapter. Adapters include one or more attached procedures and the initialization steps to register them to the reasoning engine.

The bulk of the interface between the attached procedures and the reasoning engine is provided in the form of a C++ base class from which specific adapters inherit. The C++ baseAdapter class includes the code which creates objects to register the adapter to the reasoning engine and the code which is invoked to register specific attached procedures to the reasoning engine. The C++ baseAdapter class also defines the calling interface between the reasoning engine and the attached procedures.

In the current embodiment, adapters are built as a single OS/2 Dynamic Link Library containing the code to implement the attached procedures and the code needed to register the adapter and attached procedure to the RAISE reasoning engine.

Attached Procedure Registry

The attached procedure registry is an associative structure that provides a mapping between names provided by the attached procedures and their entry points. Attached procedures are stored in the registry by both their name and domain. Each attached procedure is further identified by its required inputs and outputs, as well as whether it is an effector or sensor.

Figure 2:
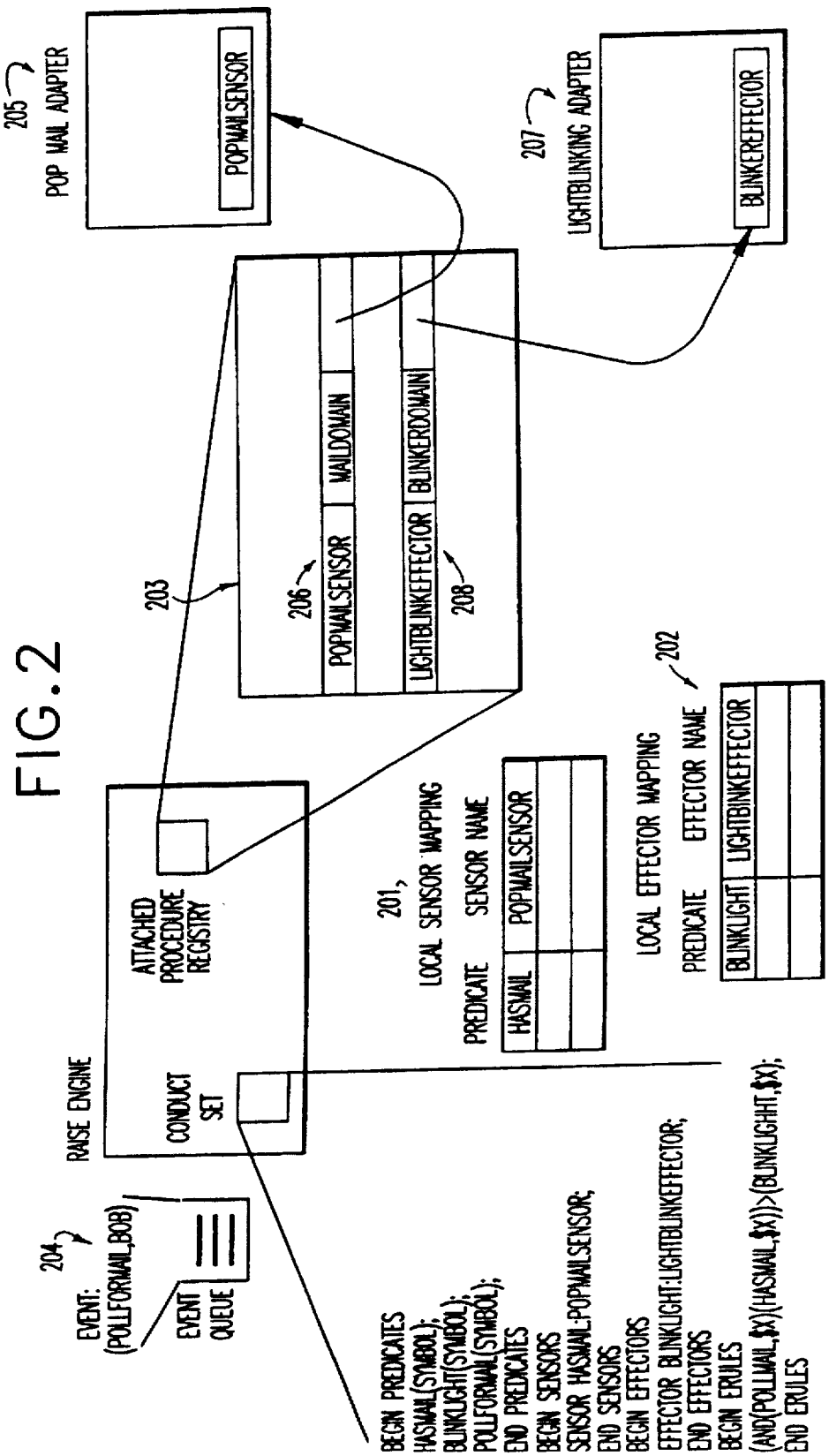
Figure 3:
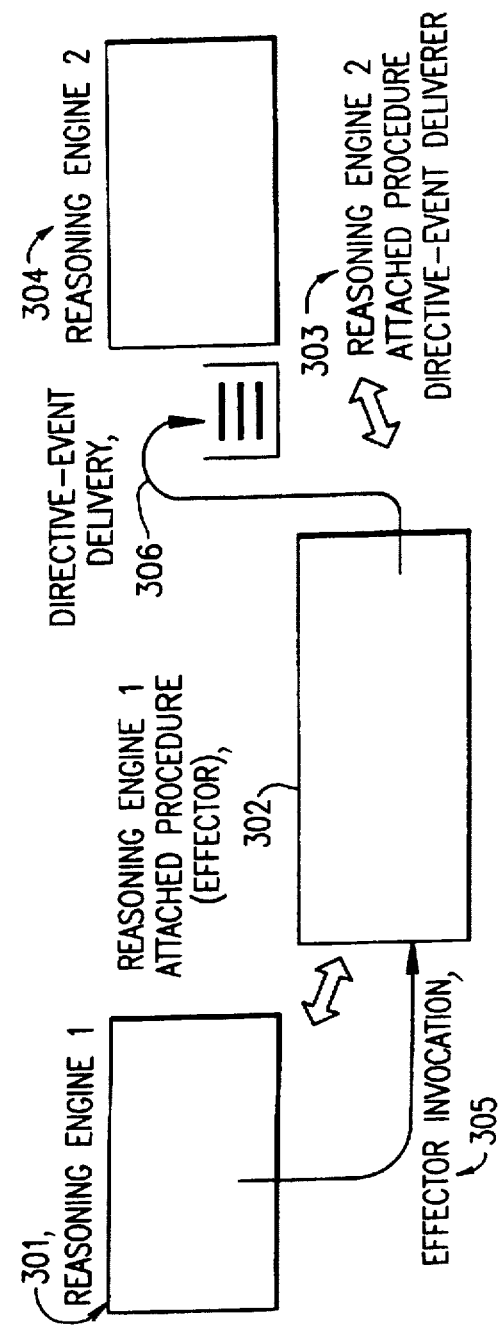
Figure 4:
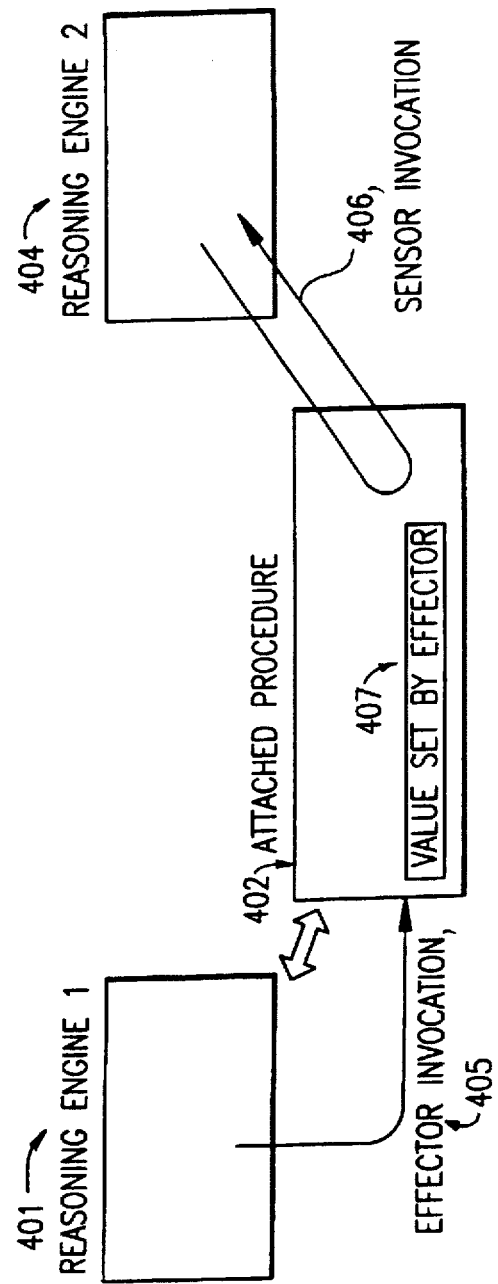
Figure 5:
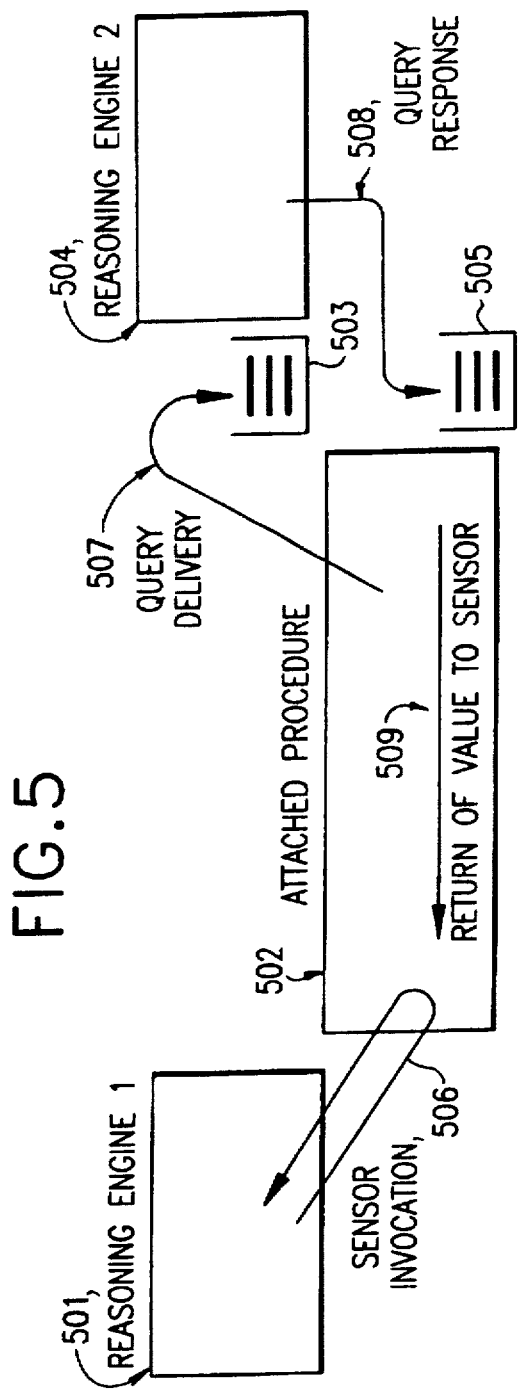

For a diagrammatic representation of the Attached Procedure Registry, refer to item 203, on FIG. 2.

Dynamic Registration Algorithm

When an attached procedure is loaded, it registers itself to the reasoning environment. This registration process comprises the attached procedure registering its name, domain and signature. An attached procedure's signature is defined as the types of each of its variables.

Registration details

The dynamic registration process comprises the following steps.

1. The reasoning engine loads the dynamic link library containing the attached procedure.
2. The initialization routine in the dynamic link library is invoked.
3. The initialization routine builds an object to represent the adapter to the reasoning engine.
4. The initialization routine registers the adapter object to the reasoning engine
5. The initialization routine registers each attached procedure to the reasoning engine.

Conduct set.

A conduct set is the collection of related data structures which describe the reasoning strategy for a specific case of reasoning. This includes a set of current beliefs, a set knowledge representation expression which encode the derivation of beliefs, and a set of mappings between these knowledge representation expressions and the attached procedures which may be used by the reasoning engine during this case of reasoning.

Vocabulary; Type Signature

This comprises a set of individual constants, and a set of predicates, along with a type signature for each predicate. A predicate's type signature specifies: the number of arguments that predicate takes, and for each argument, which type that argument may take on.

Current beliefs

This is the set of current assertions which are viewed as either true by virtue of being premises, or as true by virtue of having been derived as a conclusion during the process of reasoning.

Knowledge Representation Expressions

The knowledge representations are encoded as rules or facts within the Horn-form subclass of first order logic.

Sensor and Effector Mappings

These are mappings, specific to this conduct set, between components of the knowledge representation and the various attached procedures which are registered within the engine.

TABLE 1

An example of a conduct set

BEGIN PREDICATES
HasMail(Symbol);
BlinkLight(Symbol);
PollForMail(Symbol);
END PREDICATES
BEGIN SENSORS
SENSOR HasMail:POPMailSensor;
END SENSORS
BEGIN EFFECTORS
EFFECTOR BlinkLight:LightBlinkEffector;
END EFFECTORS
BEGIN ERULES
(and(PollForMail,$x)(HasMail,$x))>(BlinkLight,$x);
END ERULES;

Reasoning Context

A reasoning context is a conduct set combined with a specific underlying motivation for reasoning, along with the ancillary data structures needed to support the performing of reasoning.

Underlying Motivation

This is the cause of the current reasoning context: the trigger directive event which caused a forward reasoning session to be initiated, or the query directive event which is being satisfied by a backwards chaining session.

User

This is the identity of the user for whom this reasoning is being performed. A user my be an actual end user, or another computing entity. The user's identity is used to determine which conduct set should be used when reasoning about the event.

Attached Procedure Selection algorithm

Sensing

When the reasoning engine determines that it needs to determine the current value of a fact, and that fact currently is not established in the reasoning environment, it consults the set of sensors which are registered to the current reasoning context and sees if any sensors are available which can supply a value for the fact.

The set of sensors which are mapped to the desired fact are then called, in sequence until a sensors provides a value for the fact, or all sensors have been called, in which case the fact is not established.

The following describes, in detail, the steps involved in sensing

1. The value of a fact, is requested.
2. The engine determines no such fact is currently available in its collection of current facts.
3. The local conduct set is examined to determine if a mapping exists between the desired fact and a sensor 4. If a mapping exists, the attached procedure is called to evaluate the value of the fact.
5. If a fact is established, it is returned.
6. If no fact is established, the engine continues calling any other mapped sensors, until all sensors have been called, or a value has been established for the fact.

Effecting

When the reasoning engine concludes a new fact, it examines the current reasoning context to determine if an effector has been registered to the knowledge representation expression representing the concluded fact. If such a registration exists, the effector which has been mapped is called.

Run time invocation algorithm

When a sensor or effector is selected for execution, the attached procedure registry provides facilities for calling the external code which is required. Within each conduct set, a local mapping between knowledge representation expression and attached procedures is stored, including a direct pointer to the stored information required to call the procedure. This pointer is used to call the underlying attached procedure. The attached procedure then executes, either within the caller's address space, or in a separate address space, depending on the specific implementation of the attached procedure registry.

Event Delivery Mechanism

When an attached procedure wishes to inform the reasoning engine that an event has occurred, about which the engine may desire to reason, the following steps are followed:

1. A knowledge representation description of the event is built. This description is built in a portable form based on KIF/KQML.
2. The description of the event is placed in a queue for the engine's consideration.
3. The engine is notified that a new event is available for reasoning.

Query Delivery Mechanism

"Query processing" (i.e., responding to a delivered query directive event) is parallel to "event notification" (i.e., responding to a delivered trigger directive event), with one additional step. Unlike event notification, it is necessary to return a value when a query has been satisfied. In order to prevent running the reasoning engine in synchronous form driven by the attached procedures which deliver queries, the engine runs asynchrounously, returning responses to queries through a queue provided by the calling attached procedure.

The engine then processes the query, and returns the results to the queue registered by the calling attached procedure.

Figure 6:
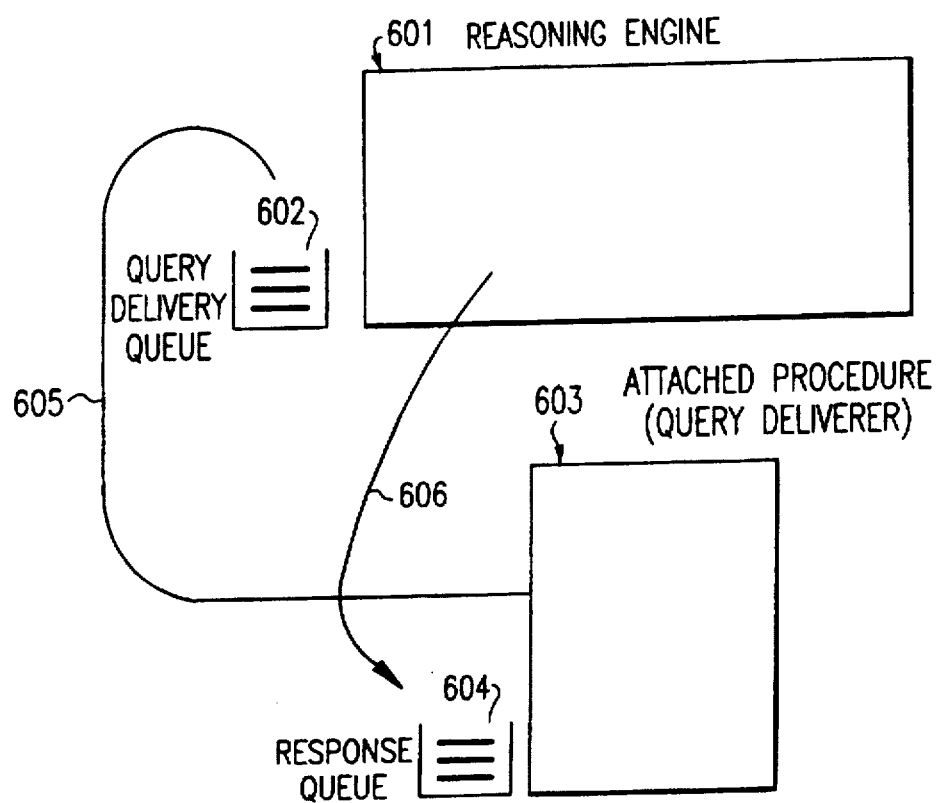
Figure 7:
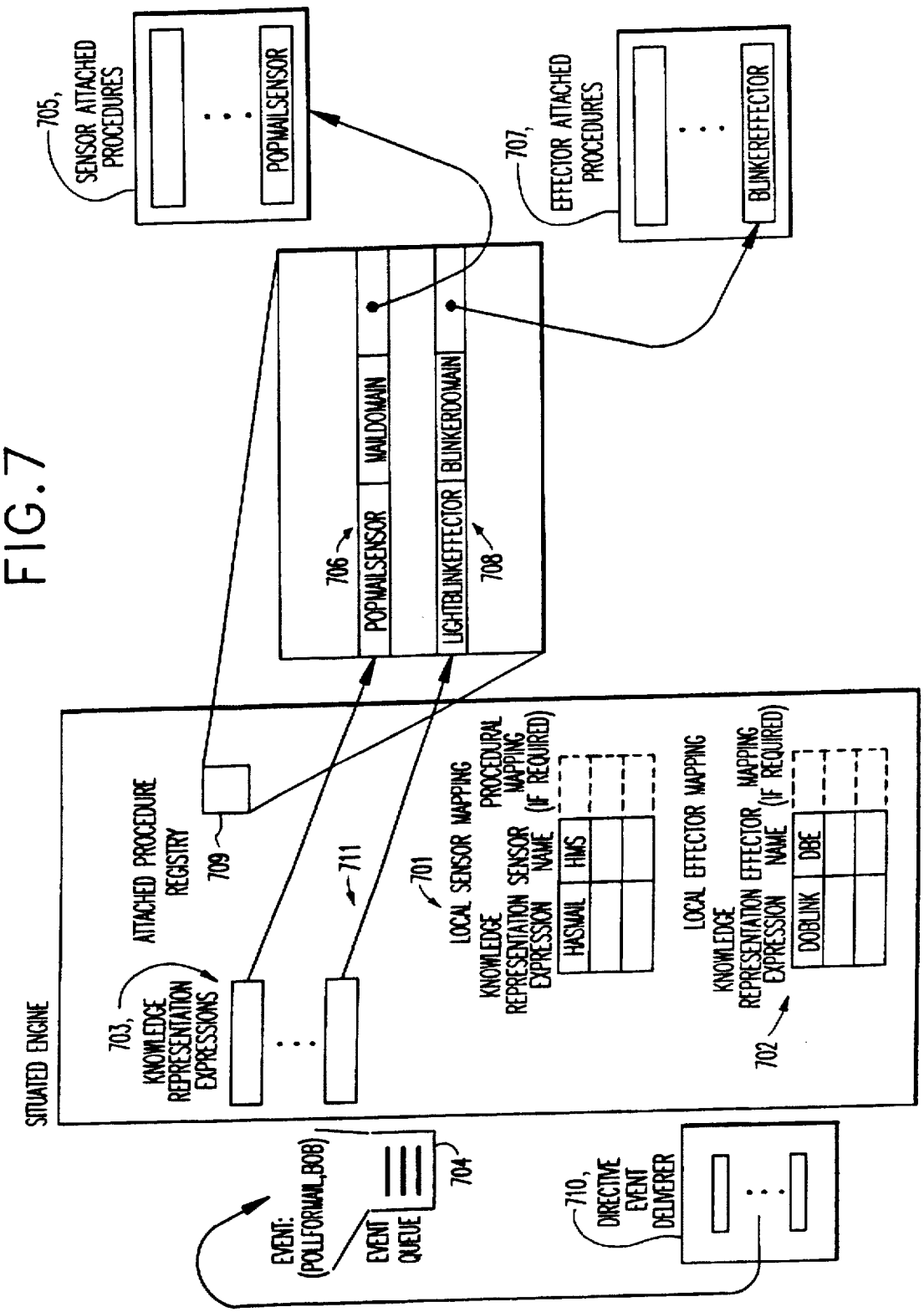

This arrangement is described in FIG. 6. A reasoning Engine (Item 601) with an attached procedure in the form of an query deliverer (item 603). The attached procedure delivers queries to the reasoning engine by placing them into the engine's query queue (Item 602) Upon resolution, the engine returns its results to the attached procedure via its response queue (item 604).

A query comprises a query for the engine to satisfy, the user (conduct set) under which the query should be processed and a response queue for the response to be delivered to. As with event delivery, the facts in the query are delivered in a portable form derived from KIF/KQML.

AN EXAMPLE OF THE EMBODIMENT IN USE

Overview

This section walks through the embodiment, describing it in use, and highlighting certain aspects of the invention. It describes the loading of two adapters, which contain sensors and effectors, the loading of a conduct set for a user, the delivery of an event for the reasoning system to process and the invocation of the sensors and effectors.

In this example, two adapters are defined, the POPMail adapter, which contains a sensor for determining if mail exists for a named user, and the LightBlinking adapter which contains an effector which provides code to drive an externally connected light which alerts the user to the presence of mail.

Outline of steps
1. Engine Initialization
2. Adapter Loading
3. Conduct Set loading
4. Event Delivery
5. Reasoning
6. Sensor Invocation
7. Effector Invocation Engine Initialization During initialization, the RAISE engine builds all of its required data structures and then reads a configuration file listing the adapters which should be loaded. Each adapter is loaded, and in turn, registers itself and the attached procedures it contains to the reasoning engine.

Adapter Loading

The mail adapter is loaded into the system. This is represented diagrammatically, as item 205, in FIG. 2. The adapter registers itself to the Attached Procedure Registry, resulting in the entry marked as item 206, in FIG. 2. The LightBlinking Adapter is then loaded, represented as item 207, and registers itself, resulting in the entry marked as 208.

Conduct Set Loading

After the adapters have been loaded, the engine then loads conduct sets. In this example, one conduct set exists, as described in FIG. 2. This conduct set is parsed and turned into internal data structures within the inference engine. These data structures include the knowledge representation expressions and the mapping between these expressions and the sensors and effectors used by the conduct set. For the Sensor Mapping, see 201 on FIG. 2, for the effector Mapping, see 202, also on FIG. 2.

Event Delivery

Once the reasoning environment has been initialized, an event is dropped into the input queue of the inferencing engine.

The event has two major components. It identifies which user which the engine is supporting should reason about the event. This is used to select a conduct set for reasoning. It also contains one or more facts which are used to initialize the reasoning process. In this case, the fact is "PollForMail" which is used to cause the engine to check whether there is mail for the user.

Reasoning

The conduct set is selected, and the reasoning environment begins reasoning. At this point, there is one short term fact, in the form of the input from the event. (PollForMail, Bob)

The reasoning engine attempts to satisfy the rule:
(and(PollForMail,$x)(HasMail,$x))>(BlinkLight,$x)

The first clause, PollForMail can be satisfied with $x substituted for Bob. The engine then attempts to satisfy (HasMail,Bob).

Sensor Invocation

When the engine attempts to satisfy HasMail,Bob, it finds no established value for HasMail,Bob in its current set of short term facts. It then examines the local sensor mapping (FIG. 2, item 201) and determines that there is a sensor which could be called to satisfy this request. The sensor's name is used to find the sensor in the Attached Procedure Registry, and the sensor is called.

The Sensor is free to do any processing it desires to determine the answer to the query which has been passed to it. In this example, the sensor would call the underlying interface to the mail server and query it to determine if there was mail for "Bob." We will assume that this is the case.

The sensor builds a binding list to return to the Reasoning Engine, asserting that the condition it senses is true. This permits the reasoning engine to satisfy the second clause of the rule, and conclude. (BlinkLight,Bob)

Effector Invocation

When the reasoning engine concludes the fact (BlinkLight,Bob) it checks to see if this fact is already known. In this case, it is a new fact, and the engine therefore adds it to its collection of facts, and checks to see if there are any effectors registered to the knowledge representation expression BlinkLight.

In this case, the Local Effector Mapping (FIG. 2, 202) reveals a mapping to the LightBlinkEffector. The engine calls the LightBlinkEffector.

We claim:

1. A method for situating a given automated reasoning system, that given reasoning system having means for storing premises as knowledge representation expressions, each said knowledge representation expression including more than two argument positions to enable mapping from said more than two argument positions and concluding knowledge representation expressions during the process of reasoning, and evaluating or testing knowledge representation expressions during the process of reasoning, and responding to delivered directive events that request, explicitly or implicitly, the reasoning system to perform reasoning;

the method comprising:

providing the given automated reasoning system;

providing a set of attached procedures, whose procedural interfaces pass knowledge representation expressions of a kind compatible with the knowledge representation expressions of the given automated reasoning system;

registering the names of, and explicit or implicit procedural interfaces of the attached procedures, making the situated reasoning system aware of the procedural interfaces in preparation for use of those attached procedures;

providing a specified partial mapping between knowledge representation expressions and the attached procedures, such partial mapping comprising a set of mapping elements, each such element including:

a knowledge representation expression including more than two argument positions, and a name of an attached procedure; and invoking the attached procedures during the process of situated reasoning, through use of said partial mapping.

2. The method of claim 1, wherein one or more of the attached procedures are effectors.

3. The method of claim 2, wherein the situated reasoning engine effects using attached effector procedures, where such using of attached effector procedures comprises:

selecting such procedures according to the method of claim 1;

deriving conclusions; and, performing actions by invoking the selected procedures that correspond to the derived conclusions knowledge representation expressions.

4. The method of claim 1, wherein one or more of the attached procedures are sensors.

5. The method of claim 4, wherein the situated reasoning engine senses using attached sensor procedures, where such using of attached sensor procedures comprises:

selecting such procedures according to the method of claim 1;

testing knowledge representation expressions during reasoning; and, determining the values of tested knowledge representation expressions by invoking the selected procedures.

6. The method of claim 1, wherein one or more of the attached procedures perform directive event delivery, such a delivered directive event comprising:

a set of assertions, in the form of knowledge representation expressions; and a request, explicit or implicit, to the reasoning system to perform reasoning that, in part or in whole, uses that set of assertions;

wherein a subset of the knowledge representation expressions are in portable-version form.

7. The method of claim 6, wherein the delivered directive event is of the query sub-kind, comprising one or more queries, in the form of knowledge representation expressions; and, a request, explicit or implicit, that the reasoning system reason so as to answer those queries.

8. The method of claim 6, wherein the delivered directive event is of the trigger sub-kind, comprising the specifying of a trigger subset of premises, in the form of knowledge representation expressions; and, a request, explicit or implicit, that the situated reasoning engine reason based on the specified trigger subset.

9. The method of claim 6, wherein the delivered directive event is of the compound sub-kind, comprising the specifying of one or more queries, and of one or more trigger subsets, in the form of knowledge representation expressions; and, a request, explicit or implicit, that the situated reasoning engine reason to answer those queries and based on those trigger subsets.

10. The method of claim 1, further comprising statically attaching the attached procedures to the situated reasoning engine.

11. The method of claim 1, further comprising statically registering the attached procedures to the situated reasoning engine.

12. The method of claim 1, further comprising dynamically attaching the attached procedures to the situated reasoning engine.

13. The method of claim 1, further comprising dynamically registering the attached procedures to the situated reasoning engine.

14. The method of claim 13, wherein the dynamically registering of procedures comprises:

dynamically attaching external procedures, that are compiled and/or interpreted and loaded separately from the given reasoning system, to that reasoning system;

dynamically registering named attached procedures; and, dynamically mapping between the attached procedures' procedural interfaces and knowledge representation expressions within the reasoning system.

15. The method of claim 1, wherein the attached procedure resides in a separate address space from the reasoning engine.

16. The method of claim 1, wherein one or more of the attached procedures reside in a separate computer from that containing the reasoning engine.

17. The method of claim 1, wherein the given automated reasoning system already has procedural attachments.

18. The method of claim 1, wherein compatibility of knowledge representation expressions comprises identicality.

19. The method of claim 1, wherein compatibility of knowledge representation expressions comprises being computationally transformable by the method comprising:

specifying additionally in the mapping a correspondence from the parameters or variables, and the expression format, grammar, or data structure, of the knowledge representation expressions of each attached procedure's procedural interface, to the parameters or variables, and the expression format, grammar, or data structure, of the given automated reasoning system's knowledge representation expressions: and transforming the knowledge representation expression of the attached procedure's procedural interface according to the specified correspondence.

20. The method of claim 1, wherein the reasoning engine's kind of reasoning includes inferencing in the knowledge representation formalism constituted by classical mathematical higher-order logic.

21. The method of claim 1, wherein the reasoning engine's kind of reasoning includes inferencing in the knowledge representation formalism constituted by non-monotonic logic.

22. The method of claim 1, wherein the reasoning engine's kind of reasoning includes inferencing in the knowledge representation formalism constituted by uncertain reasoning.

23. The method of claim 1, wherein the reasoning engine's kind of reasoning includes inferencing in the knowledge representation formalism constituted by inductive learning or statistical analysis, in which derived conclusions are predictions, patterns, or hypotheses.

24. The method of claim 1, wherein the reasoning engine's control strategy includes reasoning in a forward direction, either selectively or exhaustively.

25. The method of claim 1, wherein the reasoning engine's control strategy includes reasoning in a backward direction, so as to answer a query.

26. The method of claim 1, wherein the reasoning engine's control strategy includes a mixture of forward and backward directions.

27. The method of claim 1, wherein the reasoning engine's control strategy is based on an explicit agenda that includes an ordering in which to perform steps of reasoning or searches for conclusions.

* * * * *